United States Patent [19]

Mayne et al.

[11] 4,151,504
[45] * Apr. 24, 1979

[54] BIDIRECTIONAL SEISMIC ARRAY AND METHOD OF SEISMIC EXPLORATION

[75] Inventors: William H. Mayne; Algernon S. Badger, both of Houston, Tex.; William S. Hawes, deceased, late of Houston, Tex., by Louise A. M. Hawes, administrator

[73] Assignee: Geosource Inc., Houston, Tex.

[*] Notice: The portion of the term of this patent subsequent to May 17, 1994, has been disclaimed.

[21] Appl. No.: 793,756

[22] Filed: May 4, 1977

Related U.S. Application Data

[63] Continuation-in-part of Ser. No. 656,528, Feb. 9, 1976, Pat. No. 4,024,492.

[51] Int. Cl.² .......................... G01V 1/20; G01V 1/22
[52] U.S. Cl. .................... 340/15.5 MC; 340/15.5 TS; 340/15.5 GC; 174/70 R
[58] Field of Search .............. 340/15.5 TS, 15.5 MC, 340/15.5 GC, 17 R; 174/70 R

[56] References Cited

U.S. PATENT DOCUMENTS

| | | | |
|---|---|---|---|
| 2,266,040 | 12/1941 | Hoover, Jr. | 340/15.5 MC |
| 2,623,113 | 12/1952 | Bayhi | 340/15.5 |
| 2,698,927 | 1/1955 | Parr, Jr. | 340/15.5 CP |
| 2,747,172 | 5/1956 | Bayhi | 340/15.5 MC |
| 3,096,846 | 7/1963 | Savit | 340/15.5 |
| 3,286,228 | 11/1966 | Anstey | 340/15.5 MC |
| 3,317,891 | 5/1967 | Bradey | 340/17 R |
| 3,335,401 | 8/1967 | Kerns | 340/15.5 |
| 3,786,410 | 1/1974 | Hazelhurst | 340/17 R |
| 3,863,200 | 1/1975 | Miller | 340/17 R |
| 3,863,201 | 1/1975 | Briggs et al. | 340/15.5 MC |
| 3,887,897 | 6/1975 | Neitzel et al. | 340/15.5 MC |
| 3,916,371 | 10/1975 | Broding | 340/15.5 MC |
| 4,024,492 | 5/1977 | Mayne et al. | 340/15.5 TS |

OTHER PUBLICATIONS

"A New Method of Pattern Shooting", Parr and Mayne, Geophysics, vol. 20, No. 3, pp. 539-564 (Jul. 1955).
"Current Techniques Used in Pattern Shooting", Rummerfield, The Oil and Gas Journal, pp. 136-138, Apr. 1954.
"The Moveout Filter", Savit et al., Geophysics, vol. 23, No. 1, pp. 1-25 (Jan. 1958).
"Transient Behavior of Patterns", White, Geophysics, vol. 23, No. 1, pp. 26-43 (Jan. 1958).
"The Petty Vari-Pattern Seismic Technique", Research Bulletin, Petty Geophysical Engineering Co., available in 1950's.
"Chebyshev Optimized Geophone Arrays", Holzman, Geophysics, Apr. 1963, vol. 28, No. 2, pp. 145-155.
"Signal-to-Noise Ratio Improvements by Filtering and Mixing", Frank and Doty, Geophysics, vol. 18, No. 2, pp. 587-604 (1953).
"Notes on the Use of Multiple Geophones", Lombardi, Geophysics, vol. 20, No. 2, pp. 215-226 (Apr. 1955).

Primary Examiner—Howard A. Birmiel
Attorney, Agent, or Firm—Arnold, White & Durkee

[57] ABSTRACT

An improved seismic array and method of seismic exploration are provided which have the capability to supply data to separate recording stations simultaneously. The seismic array has a plurality of seismic detector connection points, and a seismic detector is located at each seismic detector connection point. The outputs of the seismic detectors are electrically isolated from each other, and weighting may be applied to the output of each seismic detector in the array. Two signal-carrying media are also provided in the array, and the weighted outputs of the seismic detectors are conveyed to the first end of the array over one signal-carrying medium and to the second end of the array over the second signal-carrying medium. A Chebychev weighted array is achieved by a proper selection of weighting.

56 Claims, 8 Drawing Figures

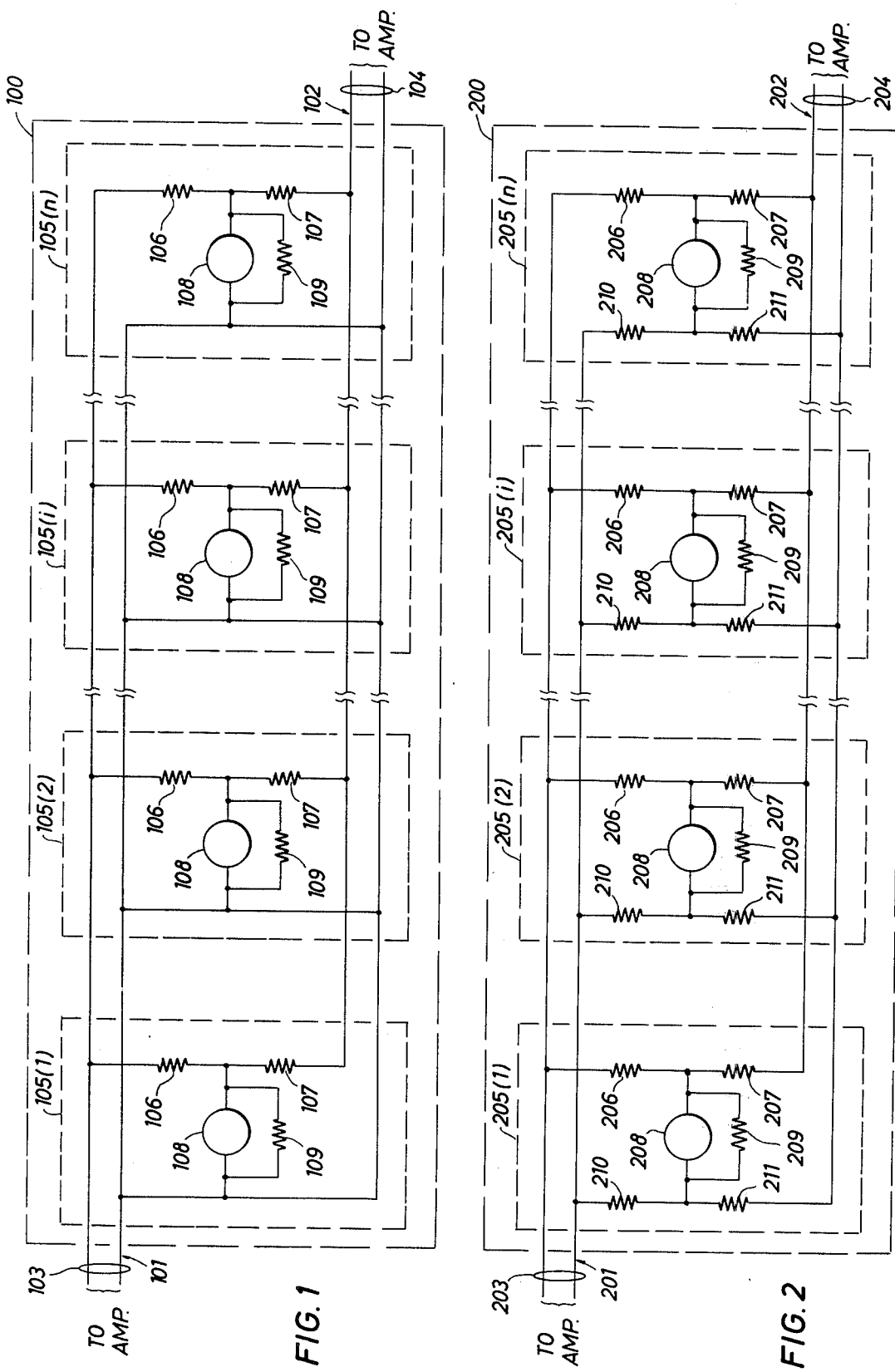

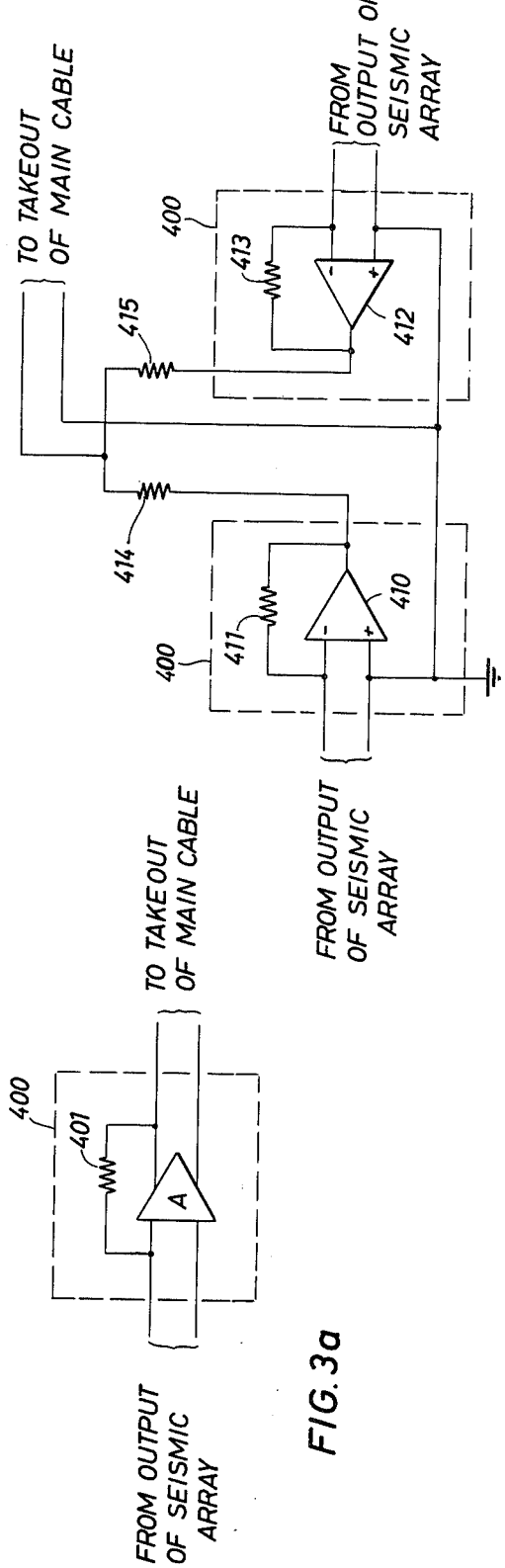
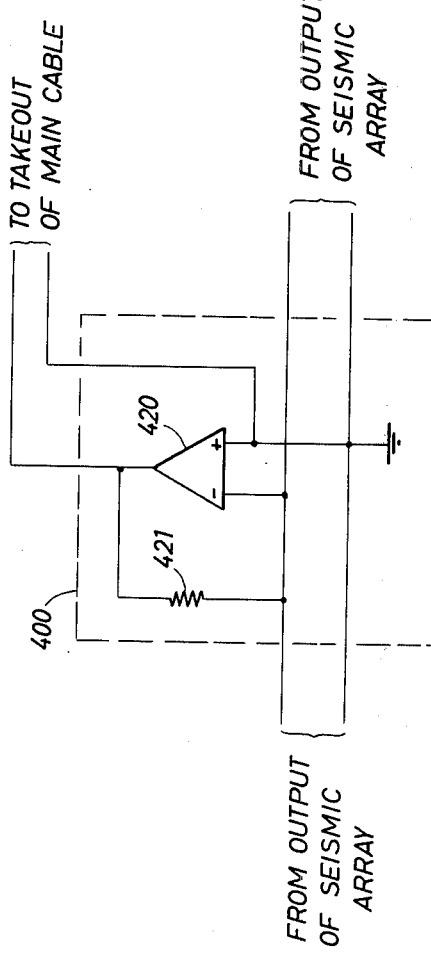
FIG. 3a
FIG. 3b
FIG. 3c

BIDIRECTIONAL SEISMIC ARRAY AND METHOD OF SEISMIC EXPLORATION

CROSS-REFERENCE TO RELATED APPLICATION

This application claims the benefit of the filing date of U.S. patent application Ser. No. 656,528, filed Feb. 9, 1976, as a continuation in part thereof.

BACKGROUND OF THE INVENTION

1. Field of the Invention

This invention relates to seismic exploration, and, more particularly, to a seismic array with bidirectional capabilities and a method of seismic exploration.

Description of the Prior Art

In seismic exploration, seismic waves are commonly used to probe the earth's crust as a means of determining the type and location of subsurface formations. The earth's crust can be considered a transmission medium or filter whose characteristics are to be determined by passing seismic waves through that medium. In the reflection seismic method seismic waves or impulses are generated at a point at or near the earth's surface, and the compressional mode of these waves is reflected from subsurface acoustic impedance boundaries and detected by arrays of seismic detectors located at the surface. The seismic detectors convert the received waves into electrical signals which are sensed and recorded in a form which permits analysis. Skilled interpreters can discern from such an analysis the shape and depth of subsurface reflection boundaries and the likelihood of finding an accumulation of minerals, such as oil and gas.

It is well-known to those skilled in the art that the complex of vibrations received at a given seismic detector array do not consist totally of waves reflected from subsurface boundaries. Rather, the array also detects unwanted random seismic events, as well as various high amplitude modes of spatially-coherent source-generated seismic events whose principal direction of propagation is horizontal, i.e., along and near the free surface. It is essential that the effects of these unwanted horizontally-propagated waves be reduced by utilizing the principles of a directional antenna to attenuate the magnitude of the electrical signal produced by the geophones in response to these waves.

In U.S. Pat. No. 2,698,927 to Parr, there is disclosed a method of reducing the effects of the coherent horizontally-propagated seismic waves. This method comprises assigning relative sensitivity values to geophones in an array. The sensitivity values are selected according to recognized antenna theory so as to reduce the magnitude of the electrical signal produced in response to the unwanted spatially-coherent seismic waves. Parr refers to his method as a "tapered sensitivity" method, since the sensitivity of the sensing devices in a given array is reduced toward either end of the array from a central point when the transducers are aligned radial to the energy sources used to generate the seismic signal. A combination of the spacing of the individual sensors, the length of the geophone array, and the wavelength bandwidths of the interference to be attenuated comprise the criteria for assigning the relative sensitivity to be employed at each geophone.

A good general review of the weighting of seismometer arrays is given by Parr and Mayne in *Geophysics*, Vol. 20, pages 539–564 (1955), and Holzman, in *Geophysics*, Vol. 28 (1963), discloses that the optimum attenuation of the effects of coherent horizontally-propagated seismic waves may be achieved by applying Chebychev weighting coefficients to the sensors in an array. The combined teachings of Parr, Parr and Mayne and Holzman are recognized standards for reducing the effects of the unwanted vibrational energy.

There have, however, been other proposals for reducing the amplitudes of the horizontally-propagated energy which is recorded. For example, in U.S. Pat. No. 2,747,172 to Bayhi, two methods are disclosed for obtaining a tapered geophone array that is designed to have a response which attenuates the electrical signals produced in response to the unwanted vibrational energy. The first method involves constructing an array having a plurality of geophones at each location in the array. The number of geophones is maximum at the center point of the array and tapers off in the direction of the ends of the array.

The second method disclosed by Bayhi is to use a single geophone at each location of the array and to install a voltage divider network across each geophone in the array. The voltage divider network at each geophone consists of resistors, and the values of the resistors used are chosen so that the geophone in the physical center of the array has the greatest sensitivity, while the geophones at the end of the array have the least sensitivity. The weighted geophone array Bayhi is apparently not bidirectional, and it appears that difficulty in maintaining a substantially constant damping factor between all geophones in the array will be encountered with the array of Bayhi.

Later, in U.S. Pat. No. 3,096,846 to Savit, there is disclosed a method of determining the seismometer weights to be applied in array tapering by using a moveout criterion. The results of Savit's method is that the distance between individual seismic detectors in a given array may not be uniform and the sensitivity of the individual seismic detectors will vary according to the moveout criterion.

From practical considerations it has been found expedient to approximate a desired weighting by constructing an array having a plurality of seismic detectors at each location in the array (e.g., as taught by Bayhi), with the number of seismic detectors at each location dictating the weighting coefficient of that location. Since it is generally agreed that the Chebychev coefficients are the optimal weights and since these coefficients are not integral numbers, the actual number of individual seismic detectors that would be required to implement (even approximately) these coefficients is very large. Hence, for this practical reason, Chebychev-weighted arrays have not generally been attempted nor realized.

Two recent patents disclose apparatus for applying Chebychev weighting coefficients to the seismic detectors in an array. In U.S. Pat. No. 3,863,200 to Miller, there is disclosed a built-in seismometer amplifier which permits the sensitivity of the individual seismometer to be adjusted at a given location. It will be noted from the Miller patent that a separate pair of wires is required to convey the signal generated at each seismometer back to a suitable recording point. Consequently, a multi-pair cable is required between the array of seismometers and the recording point in order to utilize the build-in seismometer amplifier that Miller discloses.

In U.S. Pat. No. 3,863,201 to Briggs there is disclosed a seismometer weighting apparatus to apply weighting coefficients to individual seismometer signals at a recording point. Briggs states that the apparatus may be utilized with a uniformly weighted and uniformly spaced array. It will be noted from the Briggs patent, however, that a multi-pair cable is required between the recording point and each detector in the array.

No seismic detector array has been developed to date which provides weighted sensitivity at the individual seismic detectors in the array, which maintains essentially constant damping between seismometer units, which substantially reduces the number of seismic detectors to achieve weighted sensitivity, which has bidirectional capabilities, and which supplies data from all seismic detectors to a given end of the array over a single signal-carrying medium. This useful and novel result has been achieved with the improved seismic array of the present invention.

SUMMARY OF THE INVENTION

A seismic array is provided which has bidirectional capabilities, in that data can be supplied to both ends of the array simultaneously. The array includes a plurality of seismic detector connection points with a seismic detector connected at each seismic detector connection point. Circuitry is provided for electrically isolating the responses of the seismic detectors in the array from each other, and first and second signal-carrying media are provided for conveyance of the responses of the seismic detectors to respective ends of the array. In one embodiment of the seismic array, these signal-carrying media are pairs of wires.

The seismic array of the present invention may additionally include circuitry for weighting the responses of the seismic detectors in the array. Examples of such weighting include uniform and Chebychev weighting, and, when the number of seismic detector connection points in the array equals ten, Chebychev weighting may be realized by choosing weights substantially in accordance with Table I below.

One embodiment of the present invention comprises a plurality of seismic detector connection points and a seismic detector which is located at each seismic detector connection point. A first signal-weighting component is provided at each seismic detector connection point, and one end of the first signal-weighting component is connected to one terminal of the seismic detector. A pair of wires interconnects the seismic detector connection points and emerges from one end of the array. The first wire of the first pair is connected to the second end of the first signal-weighting component at each seismic detector connection point, and the second wire of the first pair is connected to the other output of each seismic detector. A second signal-weighting component is also provided at each seismic detector connection point, and one end of the second signal-weighting component is connected to one terminal of the seismic detector. A second pair of wires is provided which interconnects the seismic detector connection points and emerges from the second end of the array. The first wire of the second pair is connected to the second end of the second signal-weighting component at each seismic detector connection point, and the second wire of the second pair is connected to the second output of each seismic detector.

Weighting of the response of the seismic detectors in the array is accomplished by connecting one pair of wires emerging from the array to the inputs of an amplifier. The amplifier has a feedback network, including a signal-weighting component, and the ratio of the value of the feedback signal-weighting component to the value of the first signal-weighting component at each seismic detector connection point defines a ratio set. The elements of the ratio set determine the magnitude of signal appearing at the output of the amplifier from the response of the seismic detector at a given seismic detector connection point.

The defined ratio set may contain elements which apply any desired weighting to the response of the seismic detectors in the seismic array. In one embodiment of the seismic array of the present invention, the defined ratio set contains elements which are substantially equal. Yet another embodiment of the seismic array of the present invention contains elements which are Chebychev weighting coefficients. The number of seismic detector connection points in a preferred embodiment of the seismic array is 10, and a ratio set having Chebychev weighting coefficients is specified in Table I below.

A second amplifier may be connected to the second pair of wires at the second end of the array. A second feedback network, including a feedback signal-weighting component is associated with the second amplifier, and the ratio of the value of the feedback signal-weighting component to the value of the second at each seismic detector connection point defines the elements of a ratio set. The elements of this ratio set determine the magnitude of signal appearing at the output of the second amplifier from the responses of the seismic detectors in the array.

The ratio set defined by the ratio of the value of the the second feedback signal-weighting component to the value of the second signal-weighting component at each seismic detector connection point may contain elements which are substantially equal or may be Chevychev weighting coefficients. When the preferred embodiment of the seismic array having ten seismic detector connection points is utilized, Chebychev weighting coefficients may be applied to the response of the seismic detectors by choosing the elements of the ratio set substantially in accordance with Table I below.

In a preferred embodiment of the seismic array of the present invention, first and second signal-weighting components are provided at each seimic detector connection point. One end of the first signal-weighting component is connected to one output of the seismic detector, and one end of the second signal-weighting component is connected to the other output of the seismic detector. A first pair of wires is provided which interconnects the seismic detector connection points and which emerges from the first end of the seismic array. The first wire of the first pair is connected to the second end of the first signal-weighting component at each seismic detector connection point, and the second wire of the first pair is connected to the second end of the second signal-weighting component at each seismic detector connection point.

This preferred embodiment of the seismic array of the present invention further includes third and fourth signal-weighting components at each seismic detector connection point. One end of the third signal-weighting component is connected to one output of the seismic detector, and one end of the fourth signal-weighting component is connected to the second output of each seismic detector. This preferred embodiment further includes a second pair of wires which interconnects the seismic detector connection points and emerges from the second end of the array. The first wire of the second pair is connected to the second end of the third signal-weighting component at each seismic detector connection point, and the second wire of the second pair is connected to the second end of the fourth signal-weighting component at each seismic detector connection point.

Weighting of the response of the seismic detectors in the array may be accomplished by connecting the first pair of wires to the inputs of an amplifier. A feedback network, including a feedback signal-weighting component, is associated with the amplifier, and the ratios of the value of this feedback signal-weighting component to the value of the first signal-weighting component and to the value of the second signal-weighting component at each seismic detector connection point defines a ratio set. The elements of the ratio set determine the magnitude of the signal appearing at the output of the amplifier from the responses of the seismic detectors in the array.

The elements contained in the defined ratio set may be substantially equal or may be Chebychev weighting coefficients. The number of seismic detector connection points in this embodiment of the seismic array is preferably equal to ten, and Chebychev weighting coefficients for this size array are specified in Table I below.

This preferred embodiment of the seismic array of the present invention may further include a second amplifier which is coupled to the second pair of wires which emerge from the second end of the array. A feedback network, including a feedback signal-weighting component is associated with this second amplifier. The ratios of the value of the feedback signal-weighting component to the values of the third and fourth signal-weighting components at each seismic detector connection point defines a ratio set and determine the magnitude of the signal appearing at the output of the second amplifier from the response of the seismic detectors in the array. The defined ratio set may contain elements which are substantially equal or may contain Chebychev weighting coefficients. Chebychev weighting coefficients are specified in Table I for the preferred embodiment of the seismic array which has ten seismic detector connection points.

A method of seismic exploration in accordance with the present invention comprises placing a bidirectional seismic array of the type described above at a first location. Seismic energy is then introduced into the earth to produce seismic waves, and these seismic waves are received by the detectors in the array. The detectors produce signals responsive to the received waves, and these signals are conveyed to the first and second ends of the array over first and second signal-carrying media, respectively.

In one embodiment, the method of the present invention comprises producing electrical signals with the seismic detectors, and further comprises electrically isolating the electrical signals produced by the seismic detectors from one another. The method of the present invention may further include weighting of the electrical signals conveyed to the ends of the array. Examples of such weighting include uniform and Chebychev weighting, and, when the bidirectional array comprises ten seismic detector connection points, weighting substantially in accordance with the weights of Table I provides Chebychev weighting.

BRIEF DESCRIPTION OF THE DRAWINGS

In the accompanying drawings:

FIG. 1 is an electrical schematic diagram which illustrates the components comprising one embodiment of the seismic array of the present invention.

FIG. 2 is an electrical schematic diagram which illustrates components comprising another embodiment of the seismic array of the present invention.

FIGS. 3a–3c are electrical schematic diagrams which illustrate various amplifier configurations for use with the seismic array of the present invention.

DESCRIPTION OF SPECIFIC EMBODIMENTS

Figure 4:
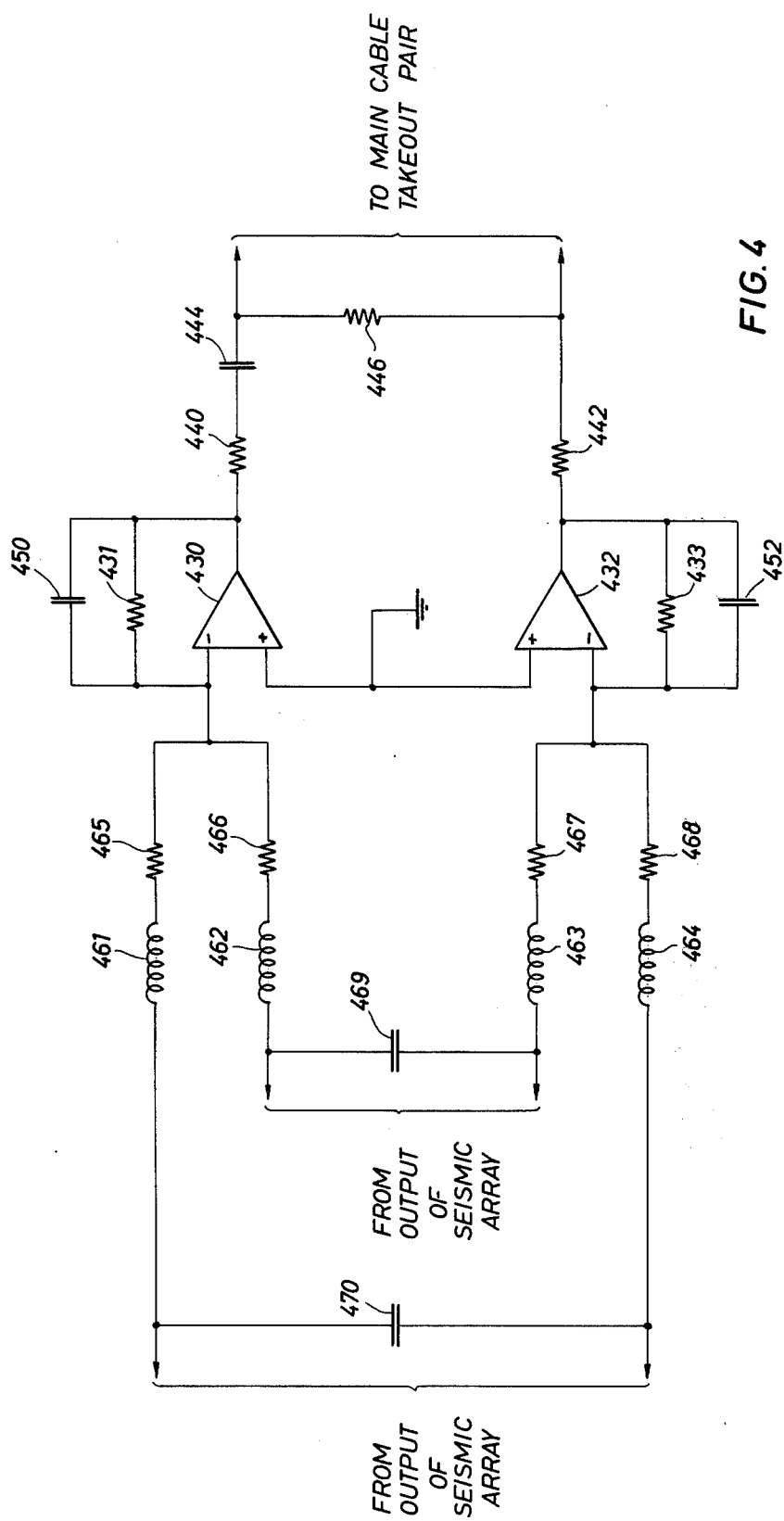
FIG. 4 is an electrical schematic diagram which illustrates a preferred embodiment of an amplifier for use with the seismic array of the present invention.

It will be appreciated that the present invention can take many forms and embodiments. Several embodiments of the invention are illustrated so as to give an understanding of the invention. It is not intended, however, that the limited embodiments herein set forth should in any way limit the true scope and spirit of the invention.

As used herein:

(1) "Seismic detector" is intended to embrace any device which receives seismic waves and produces an output in response thereto, including, but not limited to, geophones, hydrophones, accelerometers, and magnetostrictive devices.

(2) "Seismic array" designates a cable having seismic detectors for use in seismic exploration operation.

(3) "Seismic detector connection point" means locations in seismic array at which seismic detectors are connected.

(4) "Signal-weighting component" is intended to embrace any device for weighting the signal produced at the output of a seismic detector, including, but not limited to, resistors, capacitors, inductors, transformers or amplifiers.

(5) "Signal-carrying medium" is intended to embrace any medium over which a signal produced by a seismic detector may be conveyed to an end of the array.

Referring to FIG. 1, an embodiment of seismic array 100 comprises a plurality of seismic detector connection points 105(1)–105(n), and the seismic detector connection points 105(1)–105(n) are located at spaced intervals along the length of seismic array 100. The total number, n, of seismic detector connection points in seismic array 100 may vary depending upon the region of the earth in which the array is used. This being the case, the elements comprising each seismic detector connection point 105(1)–105(n) will be described with respect to a generalized seismic detector connection point 105(i), where i equals 1, 2, ... n.

Seismic detector connection point 105(i) first comprises seismic detector 108, which is preferably a two-terminal device. The frequency and phase responses of seismic detector 108 may be chosen according to any desired criteria, but it is preferable that the frequency and phase responses of all seismic detectors 108 in the array are identical. Seismic detector connection point 105(i) may additionally comprise an impedor, shown in the form of damping resistor 109, if required.

Still referring to FIG. 1, seismic array 100 further comprises a first signal-weighting component, shown in the form of first resistor 106, at each seismic detector connection point 105(i), and one end of resistor 106 is connected to one output of seismic detector 108.

This embodiment of seismic array 100 further comprises a first signal-carrying medium, shown in the form of first pair of wires 103. First pair of wires 103 interconnects all the seismic detector connection poins 105 (i) in seismic array 100. The second terminal of resistor 106 at each seismic detector connection point 105(i) is connected to one wire of pair 103, and the other wire of pair 103 is connected to the second terminal of seismic detector 108 at each seismic detector connection point 105(i). Pair 103 emerges from the first end 101 of seismic array 100.

The illustrated embodiment of seismic array 100 further comprises a second signal-weighting component, shown in the form of second resistor 107, at each seismic detector connection point 105(i). One end of resistor 107 is connected to one terminal of seismic detector 108 at each seismic detector connection point 105(i) of the array.

Still referring to FIG. 1, this embodiment of seismic array 100 further comprises a second signal-carrying medium, shown in the form of second pair of wires 104, which interconnects each seismic detector connection point 105(i) in array 100. The second end of resistor 107 at each seismic detector connection point 105(i) is connected to one wire of pair 104, and the other wire of pair 104 is connected to one terminal of seismic detector 108 at each seismic detector connection point 105(i). The second pair of wires 104 emerges at the second end 102 of seismic array 100.

Now referring to FIG. 3a, an embodiment of the seismic array 100 (FIG. 1) may additionally comprise amplifier 400. The inputs of amplifier 400 are adaptable to be connected to either pair of wires 103 or 104 which emerge from the ends of seismic array 100 (FIG. 1). Associated with each amplifier is a feedback network, including a feedback signal-weighting component, shown in the form of resistor 401.

Referring to both FIGS. 1 and 3a, when seismic energy is introduced into the earth, seismic waves are produced. Each seismic detector 108 at each seismic detector connection point 105(i) receives these seismic waves and produces an output signal in response thereto. When the inputs of amplifier 400 are coupled to pair 103, the output signal produced by each seismic detector 108 causes a current to flow via resistor 106 into the input of amplifier 400. Accordingly, the input to amplifier 400 acts as a summing junction for the current produced by the electrical signal at the output of seismic detector 108 at each seismic detector connection point 105(i). The magnitude of the signal appearing at the output of amplifier 400 from that signal is determined by the ratio of the value of resistor 401 to the value of resistor 106 at that seismic detector connection point. It is seen, therefore, that the ratio of the value of resistor 401 to the value of resistor 106 at each seismic detector connection point 105(i) defines a ratio set having a number of elements equal to the number, n, of seismic detector connection points in the seismic array 100. It should be apparent, therefore, that the contribution to the signal appearing at the output of amplifier 400 from seismic detector 108 at any seismic detector connection point 105(i) can be weighted by a proper choice of the ratio of the value of resistor 401 to the value of resistor 106 at that seismic detector connection point 105(i).

Still referring to both FIGS. 1 and 3a, in some situations it may be desirable to uniformly weight the response of each seismic detector 108 in the seismic array 100. If this is the case, the values of resistor 401 and resistor 106 at each seismic detector connection point 105(i) will be equal. In most instances, however, it is desirable to weight the response of the seismic detectors 108 so that the seismic detector which is physically nearest the amplifier makes a maximum contribution to the output of amplifier 400, while the seismic detector which is physically farthest from the amplifier makes a minimum contribution to the output of the amplifier. When pair 103 (FIG. 1) is connected to the inputs of amplifier 400 (FIG. 3a), seismic detector 108 at seismic detector connection point 105(l) is the seismic detector which is physically nearest the amplifier, while seismic detector 108 at seismic detector connection point 105(n) is the seismic detector farthest from the amplifier. The ratio of the value of resistor 401 (FIG. 3a) to the value of resistor 106 at seismic detector connection point 105(l) should, therefore, be larger than the ratio of the value of resistor 401 to the value of resistor 106 at any other seismic detector connection point 105(i).

It has been discussed that the Chebychev weighting coefficients are the optimal weights which may be applied to the response of the seismic detectors comprising seismic array 100. It is apparent, therefore, that the ratio set defined by the ratio of the value of resistor 401 to the value of resistor 106 at each seismic detector connection point 105(i) should contain elements which are Chebychev weighting coefficients, when Chebychev weighting is desired. It has been found that for most applications the preferred number, n, of seismic detector connection points in seismic array 100 is ten. When pair 103 is connected to the input of amplifier 400 and when seismic array 100 comprises ten seismic detector connection points, a ratio set containing Chebychev weighting coefficients may be applied to the responses of seismic detectors 108 by choosing the ratio of the value of resistor 401 to the value of resistor 106 at each seismic detector connection point in accordance with Table I below.

TABLE I.

| Seismic Dectector Connection Point | 1 | 2 | 3 | 4 | 5 | 6 | 7 | 8 | 9 | 10 |
|---|---|---|---|---|---|---|---|---|---|---|
| Ratio of the value of resistor 401 to the value of resistor 106 | 1.00 | .96 | .88 | .77 | .65 | .51 | .38 | .26 | .17 | .12 |

Referring still to FIGS. 1 and 3a, the above discussion has assumed that only pair 103 has been connected to the inputs of an amplifier. The embodiment of seismic array 100 illustrated in FIG. 1 may additionally comprise a second amplifier whose inputs are connected to pair 104. The second amplifier is preferably identical to amplifier 400 (FIG. 3a). A feedback network, including a signal-weighting component, shown in the form of a resistor, is associated with this second amplifier, and it will be observed that the contribution to the output of this second amplifier from a seismic detector 108 at any seismic detector connection point 105($i$) can be weighted by the ratio of the value of the feedback resistor to the value of resistor 107 at that seismic detector connection point. Chebychev weighting coefficients may again be applied to the response of seismic array 100 by choosing the ratio of the value of the feedback resistor of the second amplifier to the value of resistor 107 in accordance with the criteria set forth in Table I. It will be apparent, of course, that seismic detector 108 at seismic detector connection point 105($n$) should make the greatest contribution to the output of the second amplifier, while seismic detector 108 at seismic detector connection point 105(1) should make the least contribution to the output of the second amplifier. In other words, if a Chebychev weighted array is desired, the value of resistor 107 at seismic detector connection 105($n$) should be equal to the value of resistor 106 at seismic detector connection point 105(1), resistor 107 at seismic detector connection point 105($n$-1) should be equal to the value of resistor 106 at seismic detector connection point 105(2), etc. Hence, it is seen that the embodiment of seismic array 100 illustrated in FIG. 1 may provide a Chebychev-weighted response to two adjacent recording points simultaneously.

With reference now to FIG. 2, there is illustrated another preferred embodiment of seismic array 200 of the present invention. This embodiment comprises a plurality of seismic detector connection points 205(1)–205($n$). The description of the components comprising each seismic detector connection point will again be described with reference to a generalized seismic detector connection point 205($i$), where i equals 1, 2, ... n.

Each seismic detector connection point 205($i$) of seismic array 200 comprises a seismic detector 208. As was the case with seismic detector 108 (FIG. 1), the frequency and phase responses of seismic detectors 208 may be chosen in accordance with a particular criteria, but the frequency and phase responses of all the seismic detectors 208 in the array are preferably identical. Seismic detector 208 is preferrably a two-terminal device, and an impedor, shown in the form of damping resistor 209 may be connected across the terminals of seismic detector 208, if required.

Seismic array 200 further comprises a first signal-weighting component, shown in the form of first resistor 206, and a second signal-weighting component, shown in the form of second resistor 210, at each seismic detector connection point 205($i$). One terminal of resistor 206 is connected to one terminal of seismic detector 208 and one terminal of resistor 210 is connected to the other terminal of seismic detector 208.

Still referring to FIG. 2, the illustrated embodiment of seismic array 200 further comprises a first signal-carrying medium, shown in the form of first pair of wires 203, which interconnects all the seismic detector connection points 205(1)–205($n$) in the array. At each seismic detector connection point 205($i$), the second end of resistor 207 is connected to one wire of pair 204 and the second end of resistor 211 is connected to the second wire of pair 204. Pair 204 emerges from end 202 of seismic array 200.

Still referring to FIG. 2, the embodidment of seismic array 200 further comprises a third signal-weighting component, shown in the form of third resistor 207, and a fourth signal-weighting component, shown in the form of fourth resistor 211, at each seismic detector connection point 205($i$). One end of resistor 207 is connected to one terminal of seismic detector 208, and one end of resistor 211 is connected to the other terminal of seismic detector 208.

Still referring to FIG. 2, the illustrated embodiment of seismic array 200 further comprises a second signal-carrying medium, shown in the form of second pair of wires 204, which interconnects all seismic detector connection points 205(1)–205($n$) in the array. At each seismic detector connection point 205($i$) the second end of resistor 207 is connected to one wire of pair 204 and the second end of resistor 211 is connected to the second wire of pair 204. Pair 204 emerges from end 202 of seismic array 200.

Referring now to FIGS. 2 and 3a, the preferred embodiment of seismic array 200 additionally comprises amplifier 400, whose inputs are connected to pair 203 emerging from end 201 of the array. Amplifier 400 has a feedback network, including a signal-weighting component, shown in the form of resistor 401. The ratio of the value of resistor 401 to the sum of the values of the resistances of resistors 206 and 210 determines the contribution of seismic detector 208 to the output of amplifier 400. As was discussed with respect to FIG. 1, uniform, Chebychev, or any other weighting may be applied to the response of the seismic detectors in seismic array 200 by the ratio of the value of resistor 401 to the sum of the values of resistors 206 and 210. The preferred embodiment of seismic array 200 also comprises ten seismic detector connection points, and, if a Chebychev weighted array is desired, the ratio of the value of resistor 401 to the sum of the values of resistors 206 and 210 should be chosen in accordance with Table I set forth above.

Still referring to FIGS. 2 and 3a, an embodiment of seismic array 200 may additionally comprise a second amplifier whose inputs are connected to pair 204. This second amplifier is preferably identical to amplifier 400 and has a feedback network, including a signal-weighting component, shown in the form of resistor 401, associated with it. The ratio of the value of the feedback resistor 401 to the sum of the values of resistors 207 and 211 determines the contribution of a given seismic detector connection point 205($i$) to the output of this second amplifier.

Referring to FIGS. 1 and 2, the total length of a seismic array in accordance with the present invention and the distance between adjacent seismic detector connection points in the array is determinative of the wavelengths of seismic waves which will be attenuated, when the cable is utilized in seismic exploration operations. It is common for seismic exploration crews to have knowledge of the range of wavelengths of unwanted seismic waves which are desired to be attenuated during seismic operations. In the absence of this knowledge, it is common for the seismic exploration crew to run a "test shot" to determine the range of wavelengths of these undesired vibrations. Once the range of undersirable wavelengths is determined, the total length of the seismic array should be such that it is greater than the wavelength of the seismic wave having the lowest undesirable frequency (i.e., greater than the longest undesirable wavelength). In addition, the distance between adjacent seismic detector connection points, e.g., 105(1)–105(2), 105(2)–105(3), etc. in FIG. 1, should be chosen such that it is less than or equal to the wavelength of the seismic wave having the highest undesirable frequency (i.e., the shortest undesirable wavelength). Choosing the total length of the array and the distance between adjacent seismic detector connection points of the array in accordance with the above criteria insures that peaks (or valleys) of the highest undesirable frequency will not occur at adjacent seismic detector connection points and that peaks (or valleys) of seismic waves of the lowest undesirable frequency will not appear simultaneously at the ends of the array. In accordance with the preferred embodiment of the seismic array comprising ten seismic detector connection points, the total length of the array is 330 feet, and the distance between adjacent seismic detector connection points is 33 feet.

Figure 5:
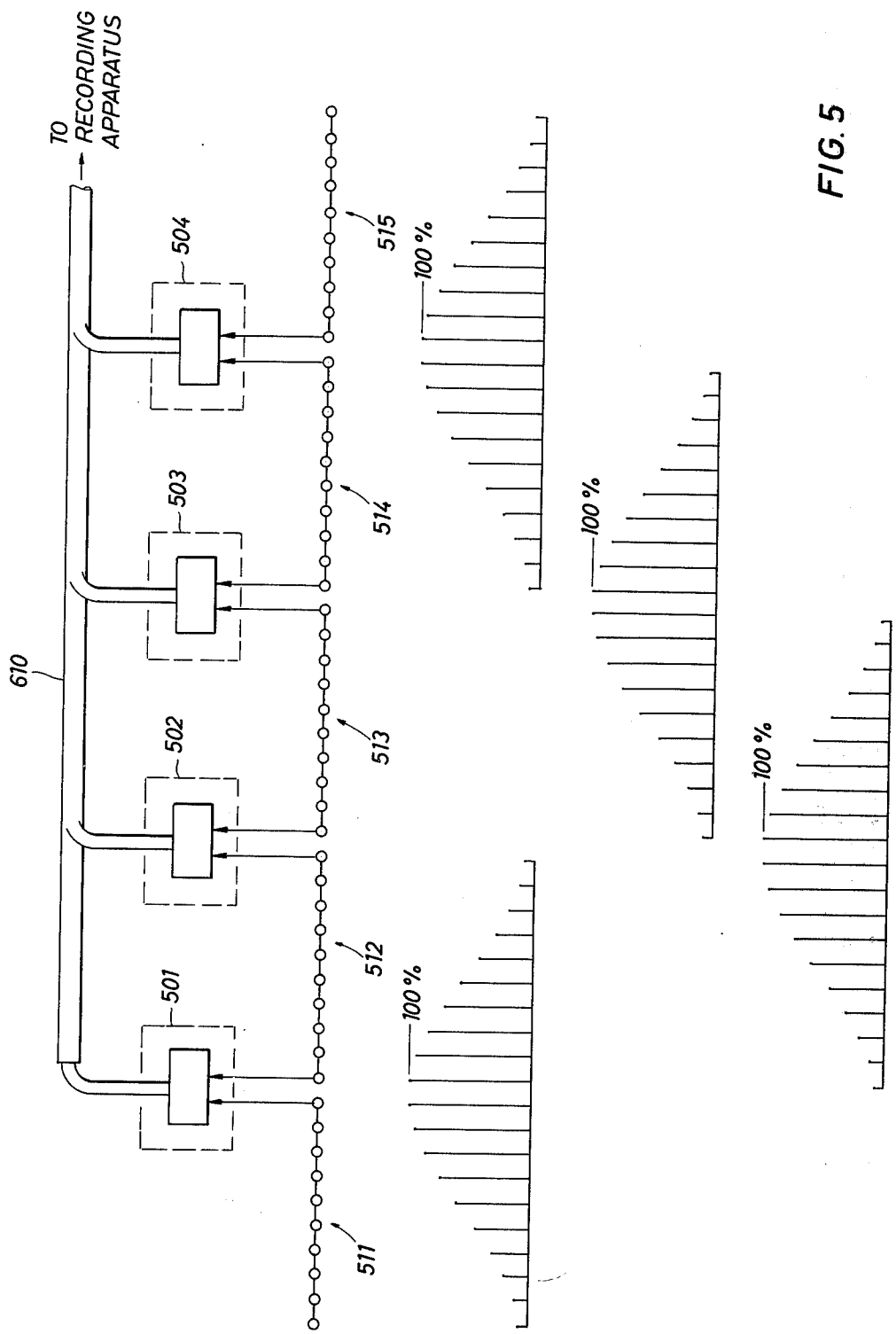
FIG. 5 is a pictorial representation of a recording system utilizing the bidirectional capabilities of the improved seismic array of the present invention.

With reference now to FIG. 5, there is illustrated a four-channel recording system which employs a plurality of seismic arrays which are constructured in accordance with the present invention. As shown, the four-channel recording system comprises four recording stations 501-504 and five seismic arrays 511-515.

Still referring to FIG. 5, the four-channel recording system additionally comprises cable 510 which is a multipair cable. One pair of wires of cable 510 is "taken out" of the cable at each recording station 501-504. Seismic data from each recording point 501-504 is supplied to the recording apparatus (not shown) over the pair of wires which is taken out at each recording point.

Still referring to FIG. 5, the illustrated four-channel recording system employs the bidirectional capabilities of a seismic array constructed in accordance with the present invention. For example, the ends of seismic array 512 are connected to the inputs of recording stations 501 and 502. It will further be observed that each recording station 501-504 receives an input from the response of two seismic arrays. The signal supplied to the recording apparatus by the output of each recording station is, therefore, a sum of the responses of the seismic arrays which provide data to its inputs. When Chebychev weighting coefficients are applied to the response of the seismic detectors in seismic arrays 511-515, the line graphs in FIG. 5 illustrate the contribution of the various seismic detectors in each array to the output signal of each recording point.

Figure 6:
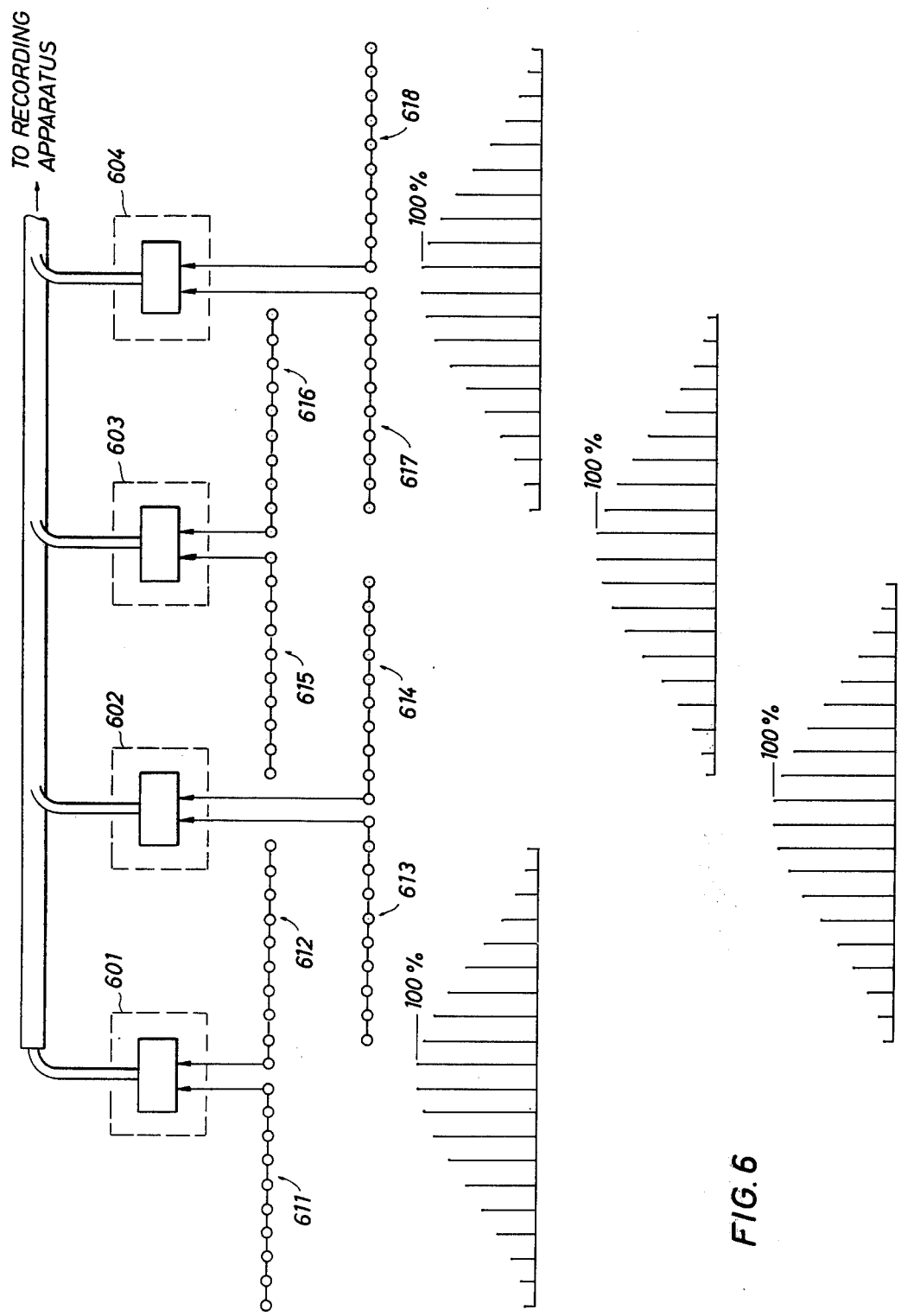
FIG. 6 is a pictorial representation of a recording system which utilizes the unidirectional capabilities of the improved seismic array of the present invention.

Referring now to FIG. 6, there is illustrated another four-channel recording system which utilizes a plurality of seismic arrays in a unidirectional mode of operation. This recording system also comprises four recording stations 601-604 and eight seismic arrays 611-618. The recording system also comprises a main recording cable 625, which is a multipair cable. One pair of wires of cable 625 are taken out of the cable at each recording station 601-604. Seismic data from each recording station is supplied to the recording apparatus (not shown) over the pair of wires which is taken out of cable 625 at each recording point 601-604.

Each recording station 601-604 receives an input signal from the response of two seismic arrays. For example, the input signal to recording station 601 is the response of seismic arrays 611 and 612. The output signal from each recording point 601-604 is a combination of the responses of the two seismic arrays which supply data to it. When Chebychev weighting coefficients are applied to the responses of the individual seismic detectors in each seismic array 611-618, the contribution of each seismic detector to the output of each recording point 601-604 is illustrated in the line graphs of FIG. 6.

Referring now to FIGS. 3b-3c and 4, there are illustrated embodiments of amplifier configurations which may be utilized at the recording stations of FIGS. 5 and 6. Each of these amplifier configurations receives the response of two seismic arrays at its inputs and combines the two responses at its output. Each amplifier configuration provides isolation between the output signals from each seismic array.

The amplifier configuration of FIG. 3b comprises two operational amplifiers 410 and 412. The non-inverting inputs of operational amplifiers 410 and 412 are each connected to a common ground, and this common ground is one of the outputs of the amplifier configuration. Feedback resistors 411 and 413 are connected between the inverting input and the output of operational amplifiers 410 and 412, respectively. One end of resistors 414 and 415 is connected to the outputs of operational amplifiers 410 and 412, respectively, and the second ends of resistors 414 and 415 are connected at a common point. This common point connection provides the second output of the amplifier configuration. The two outputs of the amplifier configuration are suitable for connection to the pair of wires which are taken out of the main recording cables in FIGS. 5 and 6.

Still referring to FIG. 3b, the inverting and non-inverting inputs of operational amplifiers 410 and 412 may be connected to the pair of wires emerging from either end of the embodiments of the seismic arrays illustrated in FIGS. 1 and 2. The signals received from the arrays are summed at the outputs of operational amplifiers 410 and 412. The ratio of the value of resistor 411 to the value of the weighting resistor at each seismic detector connection point in the array supplying a signal to operational amplifier 410 determines the contribution of each seismic detector to the ouput of operational amplifier 40. An identical function is performed by resistor 413.

The amplifier configuration illustrated in FIG. 3c comprises a single operational amplifier 420 and a feedback resistor 421 which is connected between the inverting input and the output of the operational amplifier 420. The output of operational amplifier 420 may be connected directly to one wire of the pair of wires taken out of a main recording cable at a recording point (see FIGS. 5 and 6). The non-inverting input of operational amplifier 420 is connected to a common ground, and this common ground may be connected to the other wire of the pair of wires taken out of the main recording cable at each recording point. The pair of wires emerging from either end of a seismic array (see FIGS. 1 and 2) may each be connected to the inverting and non-inverting inputs of operational amplifier 420. The ratio of the value of feedback resistor 421 to the value of the weighting resistor employed at a seismic detector connection point in either array determines the contribution of the seismic detector at that seismic detector connection point to the output of operational amplifier 420.

Referring now to FIG. 4, there is illustrated the preferred embodiment of an amplifier configuration for use with the seismic array of the present invention. This embodiment comprises operational amplifiers 430 and 432 and feedback resistors 431 and 433 which are connected between the inverting input and the output of operational amplifiers 430 and 432, respectively. This preferred embodiment further comprises capacitors 450 and 452, which are connected in parallel with feedback resistors 431 and 433, respectively. Capacitors 450 and 452 function to prevent signals having frequencies above the seismic band of interest, e.g., above 500 Hz, from appearing at the outputs of operational amplifiers 430 and 432, respectively. Capacitors 450 and 452 are preferably 0.01 mfd in value.

Still referring to FIG. 4, the preferred embodiment of the amplifier also comprises current limiting resistors 440 and 442. The outputs of operational amplifiers 430 and 432 are coupled to the first terminals of resistors 440 and 442. When the output of the amplifier configuration is connected to a pair of wires of a main recording cable, resistors 440 and 442 will limit the current back into the output of each operational amplifier 430 and 432, should a voltage surge appear on the recording cable. Resistors 440 and 442 are preferably 6.2 ohms in value.

Still referring to FIG. 4, the preferred embodiment of the amplifier further comprises capacitor 444 and resistor 446. The first terminal of capacitor 444 is connected to the second terminal of resistor 440, and the terminals of resistor 446 is connected between the second terminals of capacitor 444 and resistor 442. Capacitor 444 prevents any DC offset from appearing in the signal at the output of the amplifier configuration, and resitor 446 provides a discharge path for capacitor 444. Capacitor 444 is preferably 56 mfd in value, and resistor 446 has a nominal value of 10K ohms. The output of the amplifier configuration is across resistor 446, and one terminal of resistor 446 may be connected to one wire of the pair of wires taken out of a main recording cable at each recording point (see FIGS. 5 and 6).

Still referring to FIG. 4, the preferred embodiment of the amplifier configuration further comprises inductors 461–464, resistors 465–468 and capacitors 469 and 470. Inductor 461 and resistor 465 are connected in series, with one terminal of resistor 465 connected to the inverting input of operational amplifier 430. Inductor 462 and resistor 466 are connected in series, with one terminal of resistor 466 also connected to the inverting input of operational amplifier 430. Inductor 463 is connected in series with resistor 467, and inductor 464 is connected in series with resistor 468. One terminal of resistors 467 and 468 is connected to the inverting input of operational amplifier 432. Capacitor 469 is connected between one terminal of inductor 462 and one terminal of inductor 463, and capacitor 470 is connected between one terminal of inductor 461 and one terminal of inductor 464. The non-inverting inputs of operational amplifiers 430 and 432 are grounded. Inductors 461–464 are preferably 10 mh in value, capacitors 469 and 470 are prefereably 0.1 mfd in value and resistors 465–468 are preferably 462 ohms in value.

The preferred embodiment of the amplifier illustrated in FIG. 4 is designed to be primarily utilized with the embodiments of the seismic array illustrated in FIG. 2, and the outputs from two seismic arrays may be connected to the inputs of this amplifier configuration. The output from one seismic array may be connected between the terminals of inductors 461 and 464, and the output from a second seismic array may be connected between the terminals of inductors 462 and 463. It will be observed that the outputs of the connected seismic arrays will be summed at the inverting inputs of operational amplifiers 430 and 432.

The separate inductor-resistor-capacitor (LRC) circuit at the input to each operational amplifier 430 and 432 minimizes the cross-feed between the outputs of the arrays connected to the inputs of the amplifier configuration. This cross-feed could propagate from array to array, if separate LRC circuits were not employed.

Referring to both FIGS. 2 and 4, suppose that the wires of pair 204 of seismic array 200 (FIG. 2) are connected to terminals of inductors 461 and 464 (FIG. 4), with the wire of pair 204 which is connected to resistor 207 being connected to the terminal of inductor 461 and with the wire of pair 204 which is connected to resistor 211 being connected to the terminal of inductor 464. In this instance, the magnitude of the signal appearing at the output of operational amplifiers 430 and 432 (FIG. 4) from the response of any seismic detector 208 is determined by the ratio of the value of resistor 431 to the value of resistor 207 at that seismic detector connection point and the ratio of the value of resistor 433 to the value of resistor 211 at that seismic detector connection point. Chebychev weighting of the response of seismic array 200 may be achieved by choosing these ratios in accordance with Table I above.

In each of the amplifier configurations illustrated in FIGS. 3b–3c and 4, the voltage between the inverting and non-inverting inputs of the operational amplifiers is very small. Hence, when the output of a seismic array is connected to the inputs of any of the amplifier configurations, the amplifier configuration appears as a short circuit to the array. When, therefore, the bidirectional capabilitites of the seismic array are utilized as in the recording system illustrated in FIG. 5, it appears to the array that a short circuit exists at each end of the array. The Chebychev weighting coefficients set forth in Table I above are proportional to the values of the weighting resistors, or other suitable impedance circuits, which are utilized at any seismic detector connection point. When a short circuit is placed across the pair of wires emerging from both ends of an array having Chebychev weighting coefficients substantially as specified by Table I, it will be observed that the parallel combination of the weighting resistors at all seismic detector connection points in the array are substantially equal. Hence, a substantially constant damping factor exists between all seismic detectors in the seismic array.

When, however, the seismic array of present invention is utilized to supply data to only one recording point, a short circuit must be placed across the end of the array which is not connected to the inputs of an amplifier. This short circuit connection would be required, for example, at the ends of arrays 511 and 515 (FIG. 5) which are distal from recording points 501 and 504, respectively. Also, this short circuit connection would be required at the ends of each seismic array 611–618 which are not connected to the recording points 601–604 in FIG. 6.

It will be appreciated that a seismic array in which all seismic detectors are presented a substantially constant load may also be achieved when other types of weighting besides Chebychev weighting is applied to the response of the seismic detectors in the array. For example, when substantially uniform weighting coefficients are applied to the response of the seismic detectors in the array, a substantially constant load will be presented to all seismic detectors in the array when it appears to the detectors in the array that a short circuit exists at both ends of the array.

What is claimed is:

1. A bidirectional seismic array with first and second ends, comprising:
   a plurality of seismic detector connection points;
   a seismic detector connected at each seismic detector connection point;
   circuitry for producing first and second separate and independent signals from the response of each seismic detector;

a first signal-carrying medium over which the first signals from all of the seismic detectors may be conveyed to the first end of the array;

a second signal-carrying medium over which the second signals from all of the seismic detectors may be conveyed to the second end of the array; and circuitry for preventing the first signals at the first end of the array from interfering with the second signals at the second end of the array.

2. The seismic array of claim 1, wherein the first signal-carrying medium comprises a pair of wires.

3. The seismic array of claim 1, wherein the second signal-carrying medium comprises a pair of wires.

4. The seismic array of claim 1 further comprising circuitry for weighting the responses of the seismic detectors in the array.

5. The seismic array of claim 4, wherein Chebychev weighting is applied to the responses of the seismic detectors.

6. The seismic array of claim 4, wherein uniform weighting is applied to the responses of the seismic detectors.

7. The seismic array of claim 4, wherein the number of seismic detector connection points in the array is equal to ten.

8. The seismic array of claim 7, wherein the responses of the seismic detectors are weighted substantially in accordance with the weights specified in Table I of the specification.

9. A bidirectional seismic array with first and second ends, comprising:

a plurality of seismic detector connection points;

a seismic detector connected at each seismic detector connection point;

components at each seismic detector which operate to apply separate and independent first and second weighting factors to the response of the seismic detector;

circuitry for maintaining a substantially constant frequency response from all detectors in the array;

a first signal-carrying medium over which the separate and independent responses of the seismic detectors having the first weighting factors are conveyed to the first end of the array;

a second signal-carrying medium over which the separate and independent responses of the seismic detectors having the second weighting factors are conveyed to the second end of the array; and circuitry for preventing the weighted responses of the seismic detectors at the first end of the array from interfering with the weighted responses of the seismic detectors at the second end of the array.

10. The seismic array of claim 9, wherein the first signal-carrying medium comprises a pair of wires.

11. The seismic array of claim 9, wherein the second signal-carrying medium comprises a pair of wires.

12. The seismic array of claim 9, wherein Chebychev weighting is applied to the responses of the seismic detectors.

13. The seismic array of claim 9, wherein uniform weighting is applied to the response of the seismic detectors.

14. The seismic array of claim 9, wherein the number of seismic detector connection points is equal to ten.

15. The seismic array of claim 14, wherein the responses of the seismic detectors are weighted substantially in accordance with the weights specified in Table I of the specification.

16. A seismic array having bidirectional capabilities, which comprises:

a plurality of seismic detector connection points;

a seismic detector at each seismic detector connection point;

a first signal-weighting component at each seismic detector connection point, the first signal-weighting component having one end connected to the first one output of the seismic detector;

a first pair of wires which interconnects the seismic detector connection points and which emerges from the first end of the seismic array, the first wire of the first pair being connected to the second end of the first signal-weighting component at each seismic detector connection point and the second wire of said pair being connected to the second output of each seismic detector;

a second signal-weighting component at each seismic detector connection point, the second signal-weighting component having one end connected to the first output of each seismic detector;

a second pair of wires which interconnects the seismic detector connection points and which emerges from the second end of the array, the first wire of the second pair being connected to the second end of the second signal-weighting component at each seismic detector connection point and the second wire of the second pair being connected to the second output of each seismic detector;

circuitry for maintaining a substantially constant frequency response from all detectors in the array;

circuitry for providing a negligible impedance between the wires of the first pair; and circuitry for providing a negligible impedance between the wires of the second pair.

17. The seismic array of claim 16, wherein the circuitry for providing a negligible impedance between the wires of the first pair comprises:

an amplifier which is connected between the first pair of wires at the first end of the array and the first recording point; and a feedback network, including a feedback signal-weighting component, which is associated with the amplifier, the ratio of the value of the feedback signal-weighting component to the value of the first signal-weighting component at each seismic detector connection point defining a ratio set and determining the magnitude of signal appearing at the output of the amplifier from the response of the seismic detector at that seismic detector connection point.

18. The seismic array of claim 17, wherein the defined ratio set contains elements which are substantially equal.

19. The seismic array of claim 17, wherein the defined ratio set contains elements which are Chebychev weighting coefficients.

20. The seismic array of claim 17, wherein the number of seismic detector connection points in the array is equal to ten.

21. The seismic array of claim 20, wherein the defined ratio set contains elements substantially as specified in Table I of the specification.

22. The seismic array of claim 10, wherein the circuitry for providing a negligible impedance between the wires of the second pair comprises:

a second amplifier which is connected between the second pair of wires at the second end of the array and the second recording point; and a second feedback network, including a feedback signal-weighting component, which is associated with the second amplifier, the ratio of the value of the feedback signal-weighting component of the second feedback network to the value of the second signal-weighting component at each seismic detector connection point defining a ratio set and determing the magnitude of signal appearing at the output of the second amplifier from the response of the seismic detector at that seismic detector connection point.

23. The seismic array of claim 22, wherein the defined ratio set contains elements which are substantially equal.

24. The seismic array of claim 22, wherein the defined ratio set contains elements which are Chebychev weighting coefficients.

25. The seismic array of claim 22, wherein the number of seismic detector connection points in the array is equal to ten.

26. The seismic array of claim 25, wherein the defined ratio set contains elements substantially as specified in Table I of the specification.

27. A seismic array having bidirectional capabilities, which comprises:

a plurality of seismic detector connection points;

a seismic detector at each seismic detector connection point;

a first signal-weighting component at each seismic detector connection point, the first signal-weighting component having one end connected to one output of the seismic detector;

a second signal-weighting component at each seismic detector connection point, the second signal-weighting component having one end connected to the other output of the seismic detector;

a first pair of wires which interconnects the seismic detector connection points and which emerges from the first end of the seismic array, the first wire of the first pair being connected to the second end of the first signal-weighting component at each seismic detector connection point and the second wire of the first pair being connected to the second end of the second signal-weighting component at each seismic detector connection point;

a third signal-weighting component at each seismic detector connection point, the third signal-weighting component having one end connected to one output of the seismic detector;

a fourth signal-weighting component at each seismic detector connection point, the fourth signal-weighting component having one end connected to the second output of each seismic detector;

a second pair of wires which interconnects the seismic detector connection points and which emerges from the second end of the array, the first wire of the second pair being connected to the second end of the third signal-weighting component at each seismic detector connection point and the second wire of the second pair being connected to the second end of the fourth signal-weighting component at each seismic detector connection point;

circuitry for maintaining a substantially constant frequency response from all detectors in the array;

circuitry for providing a negligible impedance between the wires of the first pair; and circuitry for providing a negligible impedance between the wires of the second pair.

28. The seismic array of claim 27, wherein the circuitry for providing a negligible impedance between the wires of the first pair comprises:

an amplifier which is connected between the first pair of wires at the first end of the array and the recording point; and a feedback network, including a feedback signal-weighting component, which is associated with amplifier, the ratios of the values of the feedback signal-weighting component to the value of the first signal-weighting component and to the value of the second feedback signal-weighting component at each seismic detector connection point defining a ratio set and determining the magnitude of signal appearing at the output of the amplifier from the response of the seismic detector at a given seismic detector connection point.

29. The seismic array of claim 28, wherein the defined ratio set contains elements which are substantially equal.

30. The seismic array of claim 28, wherein the defined ratio set contains elements which are Chebychev weighting coefficients.

31. The seismic array of claim 28, wherein the number of seismic detector connection points in the array is equal to ten.

32. The seismic array of claim 31, wherein the defined ratio set contains elements substantially as specified in Table I of the specification.

33. The seismic array of claim 28, wherein the circuitry for providing a negligible impedance between the wires of the second pair comprises:

a second amplifier which is coupled between the second pair of wires at the second end of the array and the second recording point; and a feedback network, including a feedback signal-weighting component, which is associated with said second amplifier, the ratio of the value of the signal-weighting component of the feedback network associated with the second amplifier to the value of the third signal-weighting component and to the value of the fourth signal-weighting component at each seismic detector connection point defining a ratio set and determining the magnitude of signal appearing at the output of the amplifier from the response of the seismic detector at that seismic detector connection point.

34. The seismic array of claim 33, wherein the defined ratio set contains elements which are substantially equal.

35. The seismic array of claim 33, wherein the defined ratio set contains elements which are Chebychev weighting coefficients.

36. The seismic array of claim 33, wherein the number of seismic detector connection points in the array is equal to ten.

37. The seismic array of claim 36, wherein the defined ratio set contains elements substantially as specified in Table I of the specification.

38. A seismic cable, which comprises:

a plurality of seismic detector connection points, each seismic detector connection point comprising two contact points suitable for receiving the terminals of a seismic detector;

a first signal-weighting component at each seismic detector connection point, the first signal-weighting component having one end connected to one of the contact points;

a first pair of wires which interconnects the seismic detector connection points and which emerges from the first end of the seismic array, the first wire of the first pair being connected to the second end of the first signal-weighting component at each seismic detector connection point and the second wire of the first pair being connected to the second contact point at each seismic detector connection point;

a second signal-weighting component at each seismic detector connection point, the second signal-weighting component having one end connected to the second contact point; and a second pair of wires which interconnects the seismic detector connection points and which emerges from the second end of the array, the first wire of the second pair being connected to the second end of the second signal-weighting component at each seismic detector connection point and the second wire of the second pair being connected to the second contact point at each seismic detector connection point.

39. A method of seismic exploration, comprising the steps of:

placing a bidirectional seismic array with first and second ends at a first location, said seismic array including a plurality of seismic detectors and first and second signal-carrying media;

introducing seismic energy into the earth to produce seismic waves;

receiving these seismic waves with the bidirectional seismic array and producing first and second separate and independent signals with each seismic detector responsive to the received seismic waves;

conveying the produced first and second signals from all seismic detectors to the first and second ends of the array over the first and second signal-carrying media, respectively;

preventing the first signals at the first end of the array from interfering with the second signals at the second end of the array; and maintaining the frequency response of all seismic detectors substantially the same.

40. The method of claim 39, wherein it comprises producing electrical signals with the seismic detectors.

41. The method of claim 40, wherein it additionally comprises the step of electically isolating the electrical signals produced by the seismic detectors from one another.

42. The method of claim 41, wherein it additionally comprises the step of weighting the electrical signals conveyed to the first and second ends of the array.

43. The method of claim 42, wherein uniform weighting is applied to the electrical signals.

44. The method of claim 43, wherein Chebychev weighting is applied to the electrical signals.

45. The method of claim 43, wherein the number of seismic detectors in the array is equal to ten.

46. The method of claim 45, wherein the weighting applied to the electrical signals is substantially in accordance with the weights set forth in Table I of the specification.

47. A method of seismic exploration, comprising the steps of:

establishing a bidirectional seismic array having two ends and being capable of providing separate and independent signals simultaneously to both ends, the seismic array comprising a plurality of seismic detectors;

introducing seismic energy into the earth to produce waves for travel in the earth;

receiving the seismic waves at each seismic detector and producing corresponding first and second signals;

conveying the first and second signals produced at all seismic detectors to the respective ends of the array simultaneously;

preventing the first signals at the first end of the array from interfering with the second signals at the second end of the array;

maintaining the frequency response of all seismic detectors in the array substantially the same; and making separate recordings of the signals conveyed to each end of the array.

48. The method of claim 47, wherein it comprises producing electrical signals with the seismic detectors.

49. The method of claim 48, wherein it additionally comprises the step of electrically isolating the signals produced by the seismic detectors from one another.

50. The method of claim 49, wherein it additionally comprises the step of weighting the electrical signals conveyed to the first and second ends of the array.

51. The method of claim 50, wherein uniform weighting is applied to the electrical signals.

52. The method of claim 50, wherein Chebychev weighting is applied to the electrical signals.

53. The method of claim 50, wherein the number of seismic detectors in the array is equal to ten.

54. The method of claim 53, wherein the weighting applied to the electrical signals is substantially in accordance with the weights set forth in Table I of the specification.

55. A method of seimic exploration, comprising the steps of:

providing multiple recording channels;

establishing groups of seismic detectors at spaced intervals along the earth, each group of seismic detectors being connected to a separate recording channel, each group comprising at least two separate seismic arrays whose outputs are connected in common to a recording channel, each separate seismic array having the capability to provide separate and independent signals to both its ends;

connecting a circuit between each recording channel and its associated group of seismic detectors, the circuit having characteristics to make the end of the associated bidirectional array to appear as an effective short circuit;

introducing seismic energy into the earth to produce seismic waves for travel in the earth;

receiving the seismic waves at each group of seismic detectors, and creating a corresponding detected signal; and making a recording of the detected signals created at each group of seismic detectors.

56. The method of claim 55 wherein the separate seismic arrays lying between adjacent groups of seismic detectors provide detected signals simultaneously to separate recording channels for each adjacent group.

* * * * *